United States Patent [19]

Kobayashi

[11] Patent Number: 4,618,014

[45] Date of Patent: Oct. 21, 1986

[54] WEIGHT MEASURING APPARATUS OF VIBRATION TYPE

[75] Inventor: Masaaki Kobayashi, Tokyo, Japan

[73] Assignee: Shinko Denshi Company Limited, Tokyo, Japan

[21] Appl. No.: 720,317

[22] Filed: Apr. 5, 1985

[51] Int. Cl.[4] .................... G01G 3/14; G01G 23/10
[52] U.S. Cl. ............................. 177/210 FP; 177/185
[58] Field of Search ..................... 177/185, 210 FP

[56] References Cited

U.S. PATENT DOCUMENTS

| | | | |
|---|---|---|---|
| 3,670,833 | 6/1972 | Tomohiko et al. | 177/185 X |
| 4,418,774 | 12/1983 | Whitney et al. | 177/210 FP |
| 4,531,600 | 7/1985 | Langlais et al. | 177/185 |
| 4,553,619 | 11/1985 | Fujinaga | 177/185 |

*Primary Examiner*—George H. Miller, Jr.

*Attorney, Agent, or Firm*—Russell, Georges, Breneman, Hellwege & Yee

[57] ABSTRACT

An apparatus for measuring a weight including a tuning fork vibrator to produce an oscillation signal having a frequency determined in accordance with a weight applied to the vibrator, a circuit for detecting an abnormal increase in an amplitude of the oscillation signal due to disturbing vibration to produce an abnormal signal, a frequency counter for counting the number of waves of the oscillation signal except for a period during which the abnormal signal is generated and a data processor for resetting the frequency counter each time the frequency counter has counted waves of the oscillation signal for a predetermined period and calculating a measured weight from a count value of the frequency counter.

7 Claims, 10 Drawing Figures

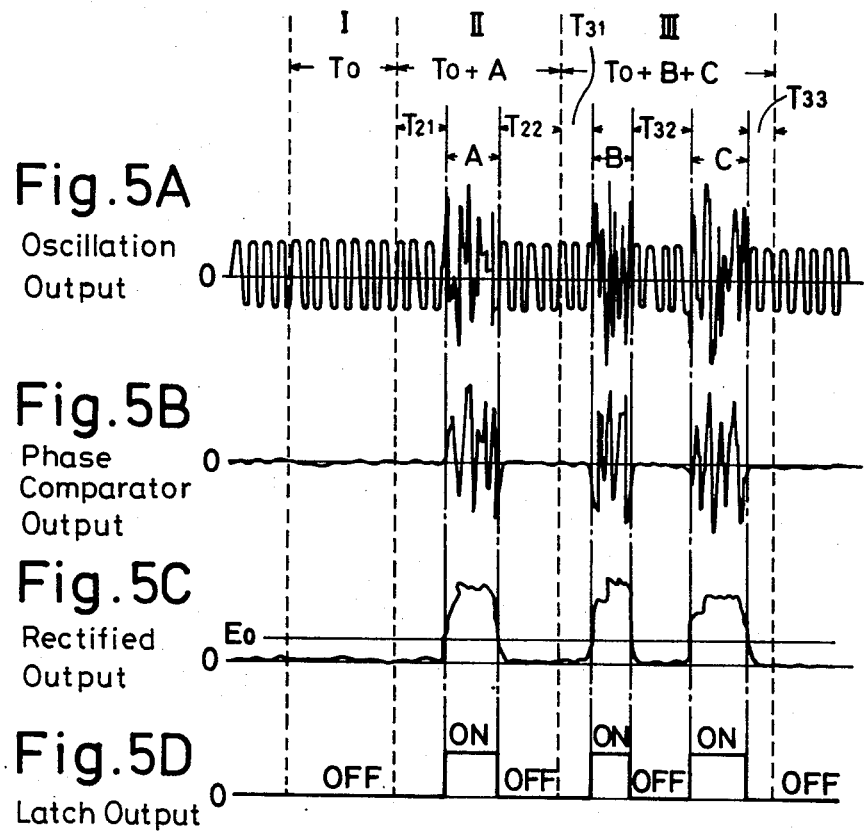

WEIGHT MEASURING APPARATUS OF VIBRATION TYPE

BACKGROUND OF THE INVENTION

The present invention relates to a weight measuring apparatus comprising a weight transducer of vibration type such as a vibrating string transducer and a tuning fork transducer.

A weight transducer comprising a vibrating string or a tuning fork has several advantages that the construction is simple and it does not require an analog-to-digital converter, because it produces a measured result directly as a digital value, i.e. the number of vibration waves. However, such a weight transducer of vibration type is very sensitive to disturbing vibration and impact applied from the external and therefore, a measured value displayed on a digital display device is liable to fluctuate and is not easily read out stably. Thus the weighing apparatus of vibration type has not been used widely.

FIG. 1 is a schematic view showing an example of the known vibration type weighing apparatus comprising a weight transducer of vibration type. The weight transducer comprising a tuning fork 1 which has a pair of vibrating strips 1a and 1b arranged symmetrically with respect to a central axis in parallel with each other. Both ends of the vibrating strips 1a and 1b are connected to each other by means of U-shaped coupling members 2a and 2b. On the both surfaces of leg portions of the lower coupling member 2b are fixed first and second piezoelectric elements 3a and 3b which are connected to an oscillator and amplifier 4. The first piezo-electric element 3a is used as a vibration pick-up element and the second piezo-electric element 3b functions to exite the tuning fork 1.

In the known weighing apparatus of the type mentioned above, by suitably selecting gain and frequency characteristics of the oscillator and amplifier 4, the vibrating strips 1a and 1b oscillate at a fundamental frequency in a symmetrical mode as illustrated by broken lines in FIG. 1. Under such condition, when a weight F to be measured is applied to the tuning fork 1 via supporting members 5a and 5b in the axial direction, vibration frequency of the tuning fork 1 is varied correspondingly to the magnitude of the weight F. Therefore, by detecting the vibration frequency of the tuning fork 1 by means of a frequency counter 6, it is possible to measure the applied weight F. However, in practice, to the tuning fork 1 might be applied various disturbing vibrations and impacts causing sudden changes in an acceleration force such as forces $f_1$, $f_2$ in the axial direction and forces $f_3$, $f_4$ in directions perpendicular to the axial direction. Then the frequency would be changed abruptly to a great extent and the normal vibrationg condition is disturbed greatly. Therefore, an accurate relation between the weight F to be measured and the frequency might be lost. Under such an abnormal condition, it is no more possible to effect the accurate measurement by known measures such that a filter is provided before the frequency counter 6 or a period for counting the vibration waves is prolonged. Therefore, the reliability of measurement is entirely lost and the displayed value could not be read stably due to the disturbing vibration.

SUMMARY OF THE INVENTION

The present invention has for its object to provide a novel and useful weighing apparatus of vibration type which can measure a weight accurately without being influenced by external vibrations and impacts.

According to the invention, an apparatus for measuring weight comprises a weight transducer of vibration type which vibrates at a frequency determined in accordance with a weight applied to the transducer to produce an oscillation signal having said frequency;

means for receiving the oscillation signal and detecting an abnormal change in the oscillation signal to produce an abnormal signal; and means for discarding the oscillation signal in response to the abnormal signal and deriving a measured weight only from the oscillation signal which is generated from the weight transducer in a normal condition.

BRIEF DESCRIPTION OF THE DRAWINGS

FIGS. 5A to 5D are signal waveforms explaining the operation of the apparatus illustrated in FIG. 4.

DESCRIPTION OF THE PREFERRED EMBODIMENTS

Figure 1:
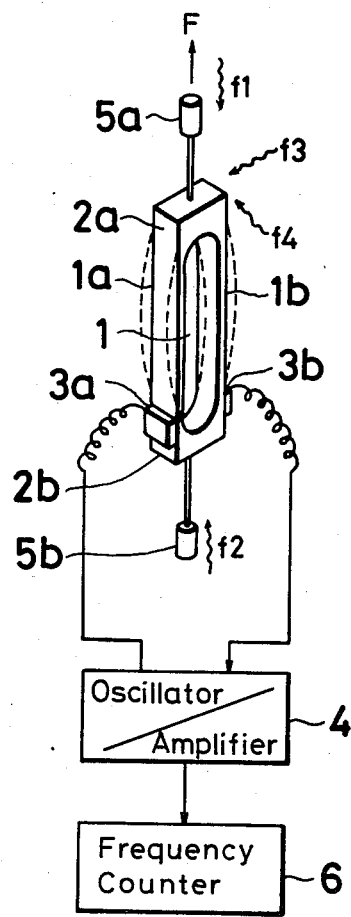
FIG. 1 is a schematic view showing a known weighing apparatus of vibration type.
Figure 2:
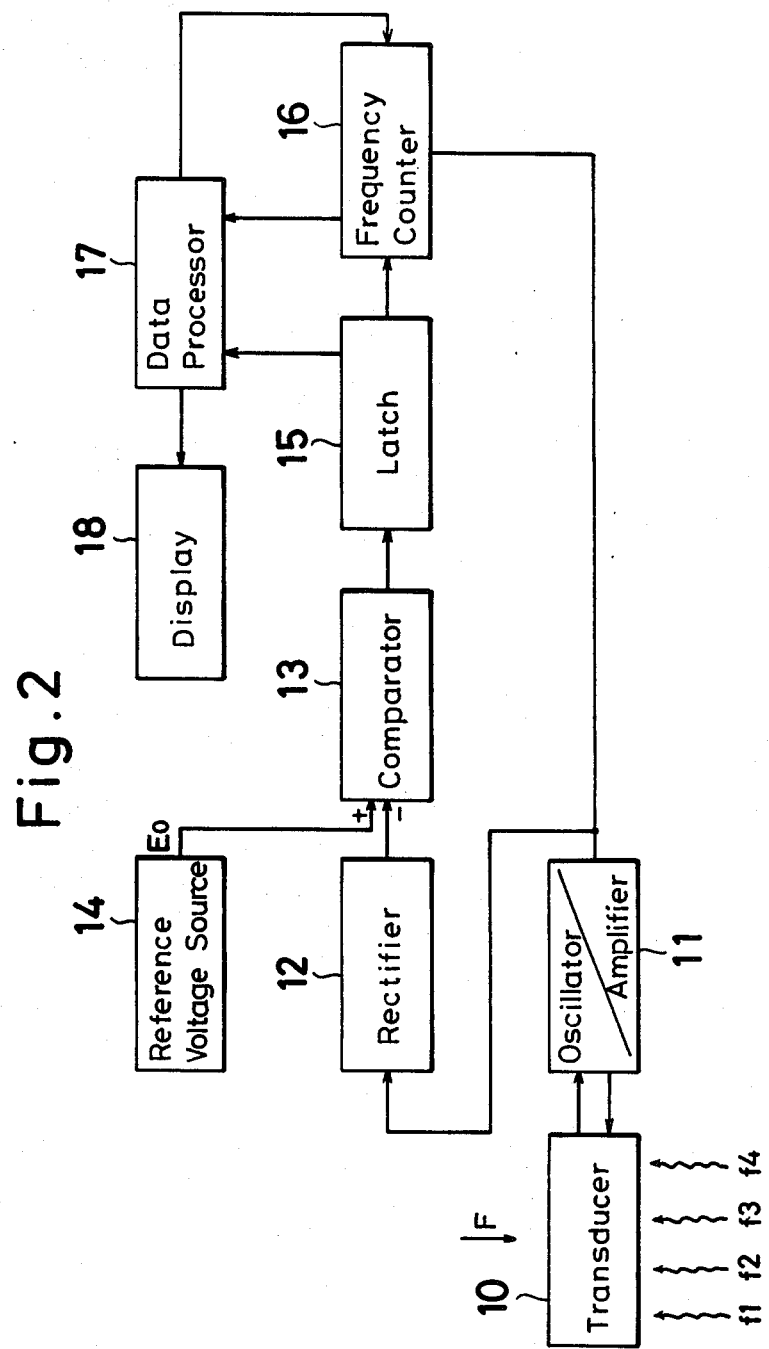
FIG. 2 is a block diagram illustrating an embodiment of the weighing apparatus according to the invention.

FIG. 2 is a block diagram showing an embodiment of the weighing apparatus of vibration type according to the invention. A block 10 represents generally a weight transducer of vibration type. In the present embodiment, the weight transducer 10 is formed by a tuning fork transducer shown in FIG. 1. The weight transducer is connected to an oscillator and amplifier 11. An output of the oscillator and amplifier 11 is connected via a rectifier 12 to a first input of a comparator 13 whose second input is connected to a presettable reference voltage source 14. An output signal from the rectifier 12 is compared in the comparator 13 with a reference voltage $E_O$ applied from the voltage source 14. An output signal of the comparator 13 is applied to a latch circuit 15 whose output signal is applied to a frequency counter 16 and a data processor 17. The output of the oscillator and amplifier 11 is also connected to the frequency counter 16 and an output count signal of the frequency counter 16 is supplied to the data processor 17. The data processor 17 may be constructed from, for instance, a microprocessor and processes the signals supplied from the latch circuit 15 and frequency counter 16 in a manner to be explained hereinbelow to produce a measured weight value which is displayed on a display device 18.

In a normal operation without any disturbance, when a weight F to be measured is applied to the weight transducer 10, the vibration frequency of the transducer 10 is changed in accordance with the amount of the applied weight F. For instance, when no load is applied to the weight transducer 10, the tuning fork vibrates at a fundamental frequency of 2 KHz, but when the weight is applied, the vibrating frequency is increased to, for instance, 2.2 KHz. Therefore, by counting the frequency of the output signal of the oscillator and amplifier 11 by means of the frequency counter 16, it is possible to detect an amount of the weight F applied to the transducer 10.

When disturbance forces $f_1$ to $f_4$ are applied to the transducer 10 in various directions via various paths, the vibration frequency as well as the amplitude of the output of the oscillator and amplifier 11 are changed abruptly to a great extent. Particularly, peak values of the oscillation signal supplied from the oscillator and amplifier 11 are abruptly increased in an abnormal manner. In the present embodiment, the application of the disturbing forces is detected by detecting the abrupt increase of the oscillation output of the oscillator and amplifier 11. To this end, the output signal from the oscillator and amplifier 11 is rectified by the rectifier 12 and the rectified signal level is compared in the comparator 13 with the reference voltage $E_O$ applied from the presettable reference voltage source 14. It should be noted that the reference voltage $E_O$ may be predetermined in accordance with the enviromental condition and the object of use. In abnormal period during which the rectified signal level of the rectifier 12 is larger than the reference voltage $E_O$, the comparator 13 generates an output signal which triggers the latch circuit 15 to produce an abnormal signal. The abnormal signal thus produced is supplied to the frequency counter 16 and data processor 17. As will be explained later, the frequency counter 16 and data processor 17 operate in response to the abnormal signal in such a manner that the frequency counter 16 does not count the oscillation signal during the abnormal condition and the data processor 17 takes the count value of the frequency counter 16 which is obtained only in the normal condition. Thus the data processor 17 proceses the frequency corresponding to a detected weight which is then indicated on the display device 18.

Figure 3:
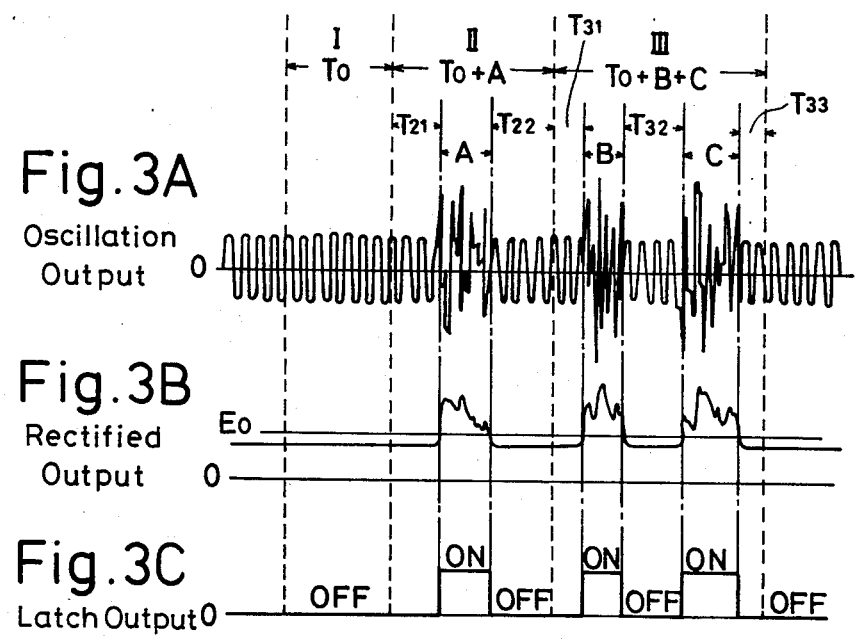
FIG. 3A to 3C are signal waveforms explaining the operation of the apparatus shown in FIG. 2.

FIGS. 3A to 3C are waveforms appearing at various points of the circuit illustrated in FIG. 2. FIG. 3A shows the oscillation output signal supplied from the oscillator and amplifier 11. In periods A, B and C, the frequency and waveform of the oscillation signal are disturbed to a great extent due to the disturbances and thus the rectified signal from the rectifier 12 is larger than the reference voltage $E_O$ preset in the reference voltage source 14 as illustrated in FIG. 3B. Therefore, the output of the latch circuit 15 is changed from OFF to ON as shown in FIG. 3C. The abnormal signal from the latch circuit 15 is supplied to the frequency counter 16 and data processor 17. When the abnormal signal is produced, the frequency counter 16 temporarily stops the counting operation to discard the disturbed oscillation signal.

In the frequency counter 16, the number of the waves of the oscillation signal is counted for a predetermined period $T_O$ as shown in FIG. 3A. In a first section I, since there is not produced any abnormal signal, the number of the oscillation waves is counted continuously by the frequency counter 16 and a counted value is supplied to the data processor 17. To this end, the data processor 17 comprises a timer circuit for counting the period $T_O$. When the timer circuit has counted the period $T_O$, the data processor 17 supplies a reset signal to the frequency counter 16 for resetting the frequency counter 16 to an initial zero count state. In a second section II, at first the frequency counter 16 counts normally the number of oscillation waves from the oscillator and amplifier 11 for a normal signal period $T_{21}$ which is shorter than the count period $T_O$. When the abnormal condition is detected for a period A, the latch circuit 15 supplied the abnormal signal to the frequency counter 16 to inhibit temporarily its counting operation. The abnormal signal is also supplied to the data processor 17 and the operation of the timer circuit is inhibited for the disturbing period A. As soon as the abnormal vibration is ended, the frequency counter 16 starts again to count the oscillation waves. When a sum of the counting periods $T_{21}$ and $T_{22}$ before and after the disturbing period A amounts to the predetermined counting period $T_O$, the data processor 17 supplies the reset signal to the frequency counter 16 to reset the count value to zero. At the same time, a new counting section III starts. In this section III, there are generated two disturbing periods B and C, and thus when a sum of effective counting periods $T_{31}$, $T_{32}$ and $T_{33}$ becomes equal to the predetermined counting period $T_O$, the frequency counter 16 is reset. In this manner, the successive count values of the number of the waves of the oscillation signal for the constant counting period $T_O$ are entered into the data processor 17. In the data processor 17, a weight is calculated in each section and the calculated weight is indicated on the display device 18. In practice, the counting period $T_O$ may be set to, for instance, 0.5 seconds.

Figure 4:
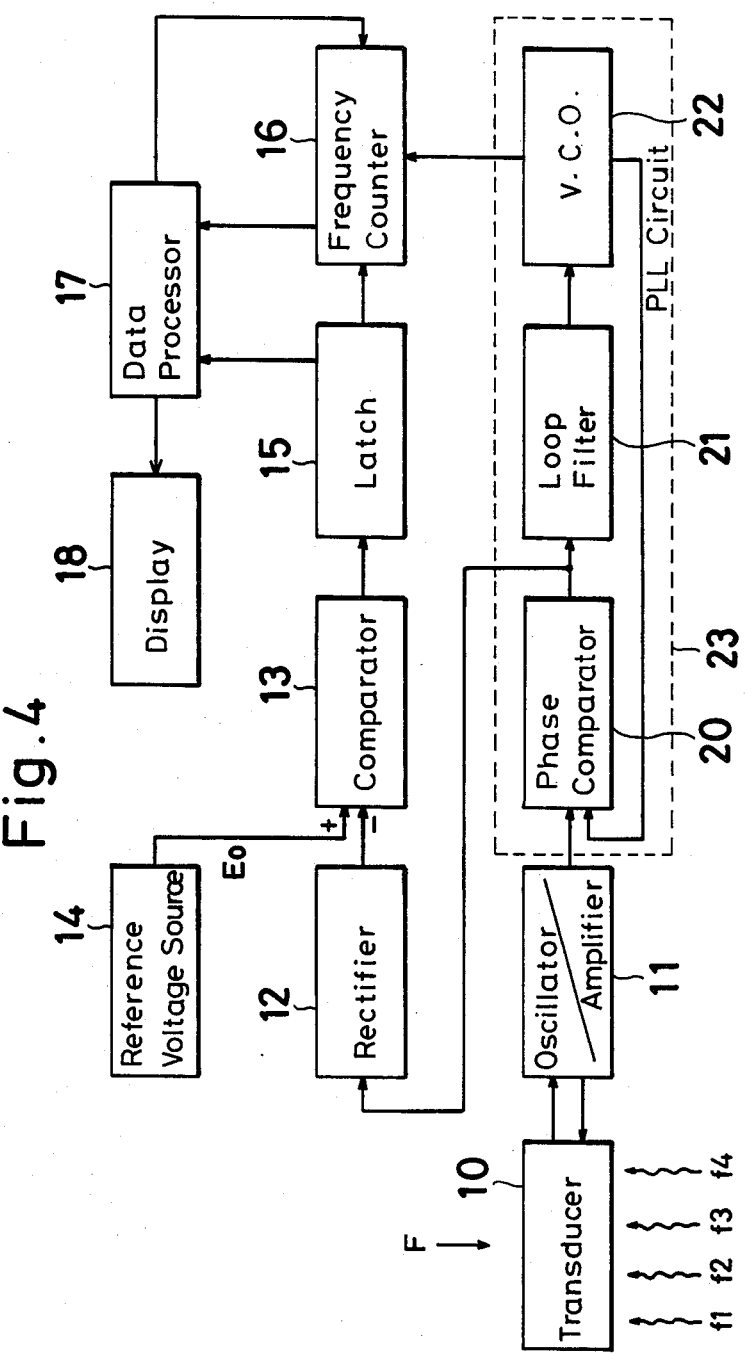
FIG. 4 is a block diagram depicting another embodiment of the weighing apparatus according to the invention.

FIG. 4 is a block diagram illustrating another embodiment of the weighing apparatus according to the invention. The present embodiment is different from the previous embodiment in the point that the oscillator and amplifier 11 is followed by a phase lock loop 23 comprising a phase comparator 20, a loop filter 21 and a voltage controlled oscillator (VCO) 22.

The oscillation output from the oscillator and amplifier 11 is supplied to a first input of the phase comparator 20 whose output is then supplied to a control input of the VCO 22 through the loop filter 21. The output signal from the VCO 22 is supplied to a second input of the phase comparator 20. The output of the VCO 22 is also supplied to the frequency counter 16.

The construction and operation of the phase lock loop 23 are well known in the art and thus a detailed explanation thereof is omitted. The phase locked loop 23 is a kind of a phase synchronous circuit. In general, the phase locked loop is used to obtain an output AC signal having the same frequency as an input signal, but having an improved S/N, or to obtain an output AC signal following faithfully an input signal when the input signal is in a steady state. On the contrary, when the frequency of the input signal to the PLL circuit changes violently or includes big noises in it, there will occur remarkable differences in phase, waveforms and frequency between the input and output signals. In practice, a single IC element may be used as the PLL circuit 23.

When the weight F is constant or changes only slowly, the PLL circuit 23 can follow the vibration frequency of the transducer 10, and thus both the phase and frequency of the oscillation output of the oscillator and amplifier 11, i.e. the input to the phase comparator 20 become identical with those of the output of the VCO 22. In the phase comparator 20, the phase of the output from the oscillator and amplifier 11 is compared with the output of the VCO 22 to derive a difference therebetween and thus the phase of the VCO 22 is controlled by the difference supplied from the phase comparator 20 in such a manner that the difference becomes zero. In this steady state, there is practically produced a phase difference of 90°. But for the sake of simplicity, this phase difference of 90° is assumed to be a reference zero phase.

When disturbing vibration and impact are applied to the weight transducer 10, the frequency and phase of the oscillation signal from the oscillator and amplifier 11 vary abruptly to a great extent and the PLL circuit 23 cannot respond to such an abrupt change. Therefore, the difference output voltage from the phase comparator 20 is largely increased to an abnormal value. This difference output voltage of the abnormal value is rectified by the rectifier 12 and the rectified voltage is compared with the reference voltage $E_O$ in the comparator 13. The remaining operation of the present embodiment is the same as that of the previous embodiment shown in FIG. 2. When the rectified voltage is higher than the reference voltage $E_O$, the latch circuit 15 supplies the abnormal signal to the frequency counter 16 and data processor 17. When the abnormal signal is detected, the counting operation of the frequency counter 16 is stopped and thus a count value of oscillation waves for the predetermined count period $T_O$ is inputted into the data processor 17. Then, the data processor 17 calculates a weight and the weight thus detected is indicated by the display device 18.

FIGS. 5A to 5D illustrate waveforms of signals appearing at various points of the apparatus shown in FIG. 4. The oscillation signal from the oscillator and amplifier 11 is shown in FIG. 5A and includes abnormal periods A, B and C due to the abnormal vibration applied to the weight transducer 10. In the abnormal periods, the frequency and phase of the oscillation signal are varied greatly. Then, the phase comparator 20 of the PLL circuit 23 produces large difference signals as shown in FIG. 5B. Therefore, the output of the rectifier 12 also increases beyond the reference voltage $E_O$ as illustrated in FIG. 5C. Then the latch circuit 15 produces the abnormal signals as depicted in FIG. 5D during the abnormal periods A, B and C. The frequency counter 16 is prevented from counting the oscillation signal waves during the abnormal periods A, B and C.

The inventor has confirmed experimentally that the influence of the disturbing vibration and impact applied to the weight transducer 10 is so large that any known measure could not compensate it. Contrary to this, according to the present invention, the influence of the disturbing vibration can be effectively removed by means of the simple construction. Particularly, in the embodiment shown in FIG. 4, it is possible to attain a very high measuring accuracy and a possible error amounts only to 0.001%.

As explained above in detail, according to the invention, since the disturbed signal due to the abnormal vibration of the weight transducer can be discarded and the measuring result is calculated only from the normal signal, the applied weight can be measured very rapidly and accurately without being affected by the disturbing vibration applied from the external. Further, the construction of the weighing apparatus according to the invention is very simple.

What is claimed is:

1. An apparatus for measuring a weight comprising
a weight transducer of vibration type which vibrates at a frequency determined in accordance with a weight applied to the transducer to produce an oscillation signal having said frequency;
means for receiving the oscillation signal and detecting an abnormal change in the oscillation signal to produce an abnormal signal, said abnormal signal being generated when an amplitude of the oscillation signal is increased abnormally;
means for producing said abnormal signal comprising a rectifier for rectifying the oscillation signal to produce a rectified signal, a reference voltage source for generating a reference voltage, a comparator for comparing the rectified signal with the reference voltage and producing an output signal when the rectified signal is greater than the reference voltage and a latch circuit triggered by the output signal of the comparator to produce the abnormal signal; and
means for discarding the oscillation signal in response to the abnormal signal and deriving a measured weight only from the oscillation signal which is generated from the weight transducer in a normal condition.

2. An apparatus according to claim 1, wherein said reference voltage source is so constructed that the reference voltage is presettable.

3. An apparatus according to claim 1, wherein said weight deriving means comprises a frequency counter for counting the number of waves of the oscillation signal except for a period during which the abnormal signal is generated and a data processor for resetting the frequency counter every time the frequency counter has counted the waves of the oscillation signal for a predetermined period, reading a count value of the frequency counter at the resetting instant and calculating the weight from the count value.

4. An apparatus according to claim 3, wherein said data processor comprises a timer circuit for counting said predetermined period except for a period during which the abnormal signal is generated to produce a reset signal for resetting the frequency counter.

5. An apparatus for measuring a weight comprising
a weight transducer of vibration type which vibrates at a frequency determined in accordance with a weight applied to the transducer to produce an oscillation signal having said frequency;
means for receiving the oscillation signal and detecting an abnormal change in the oscillation signal to produce an abnormal signal, said abnormal signal being generated when a phase of the oscillation signal is changed abruptly;
abnormal signal generating means comprising a phase lock loop for producing a difference signal corresponding to an amount of a phase variation of the oscillation signal, a rectifier for rectifying the difference signal to produce a rectified signal, a reference voltage source for producing a reference voltage, a comparator for comparing the rectified signal with the reference voltage to produce an output signal when the rectified signal is higher than the reference voltage and a latch circuit triggered by the output signal of the comparator to produce the abnormal signal; and
means for discarding the oscillation signal in response to the abnormal signal and deriving a measured weight only from the oscillation signal which is generated from the weight transducer in a normal condition.

6. An apparatus according to claim 5, wherein said phase lock loop comprises a phase comparator having a first input for receiving the oscillation signal of the weight transducer, a second input and an output for producing said difference signal, a loop filter connected to the output of the phase comparator and a voltage controlled oscillator having a control input connected to an output of the loop filter and an output for generating an output oscillation signal which is supplied to the second input of the phase comparator and to the weight deriving means.

7. An apparatus according to claim 5 wherein said reference voltage source is so constructed that the reference voltage is presettable.

* * * * *